Oct. 25, 1966  E. J. FITZ  3,280,431
APPARATUS FOR MAKING MARKED MOLDED ARTICLES
Filed Feb. 18, 1965  6 Sheets-Sheet 1
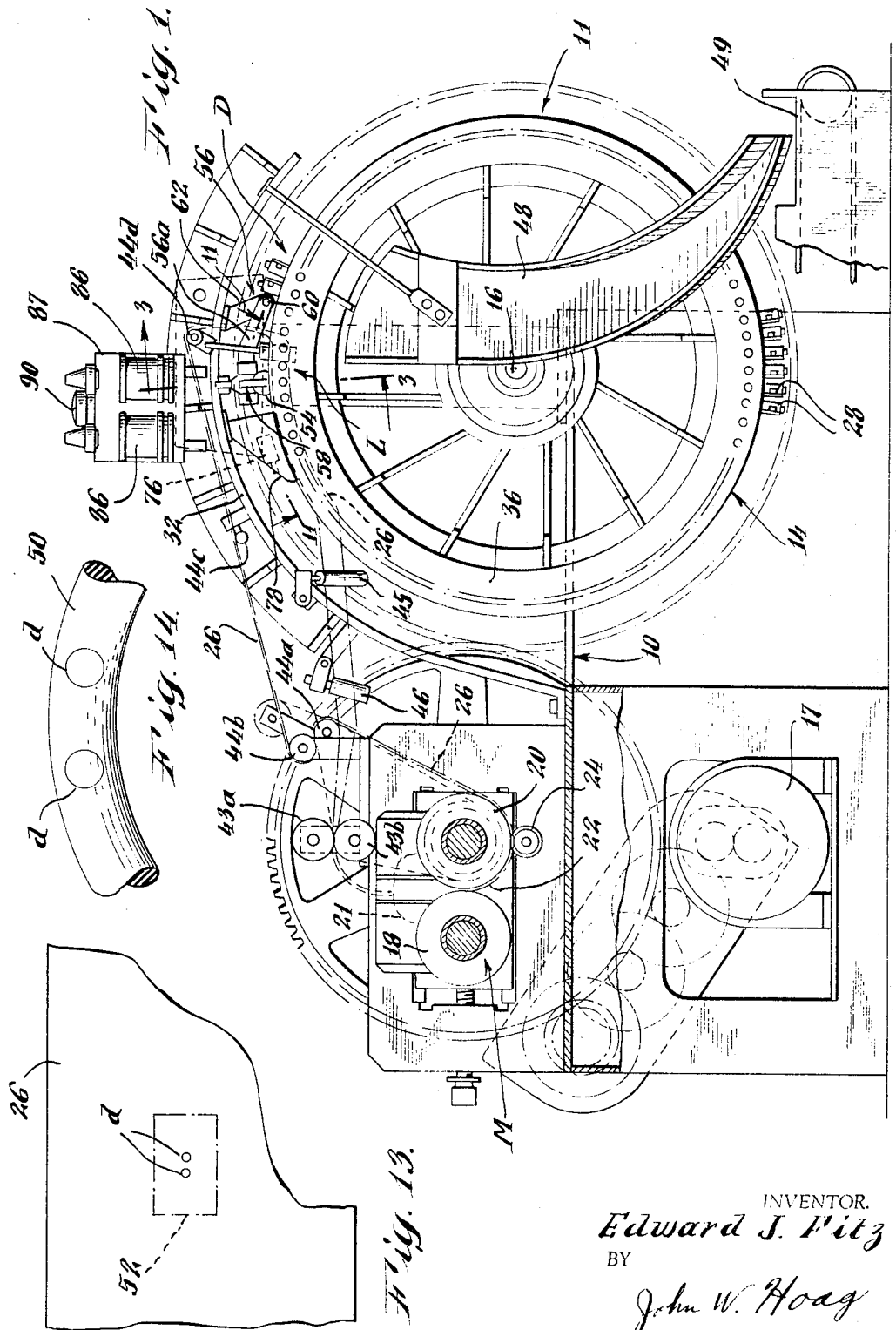
INVENTOR.
*Edward J. Fitz*
BY
*John W. Hoag*
ATTORNEY.

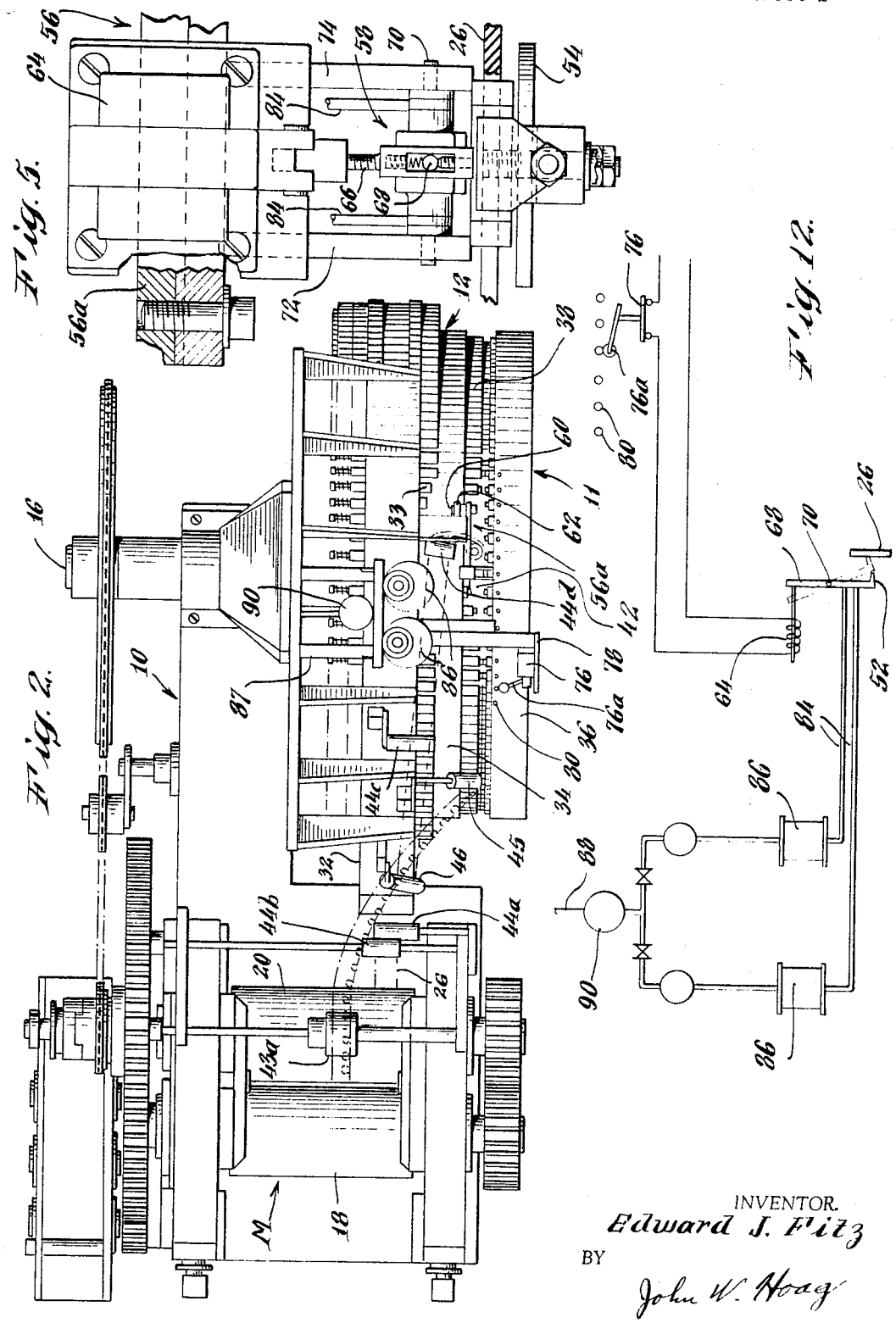

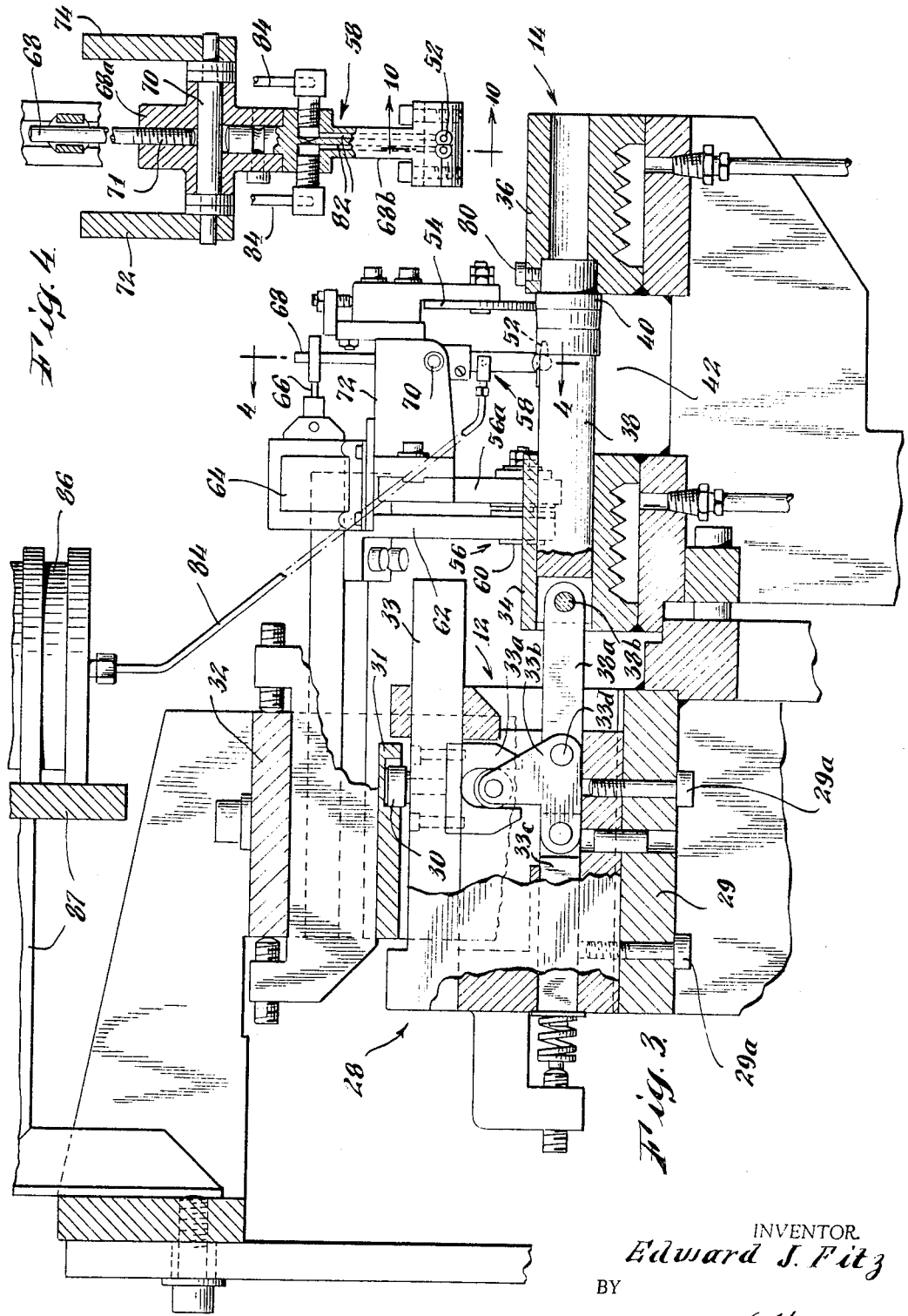

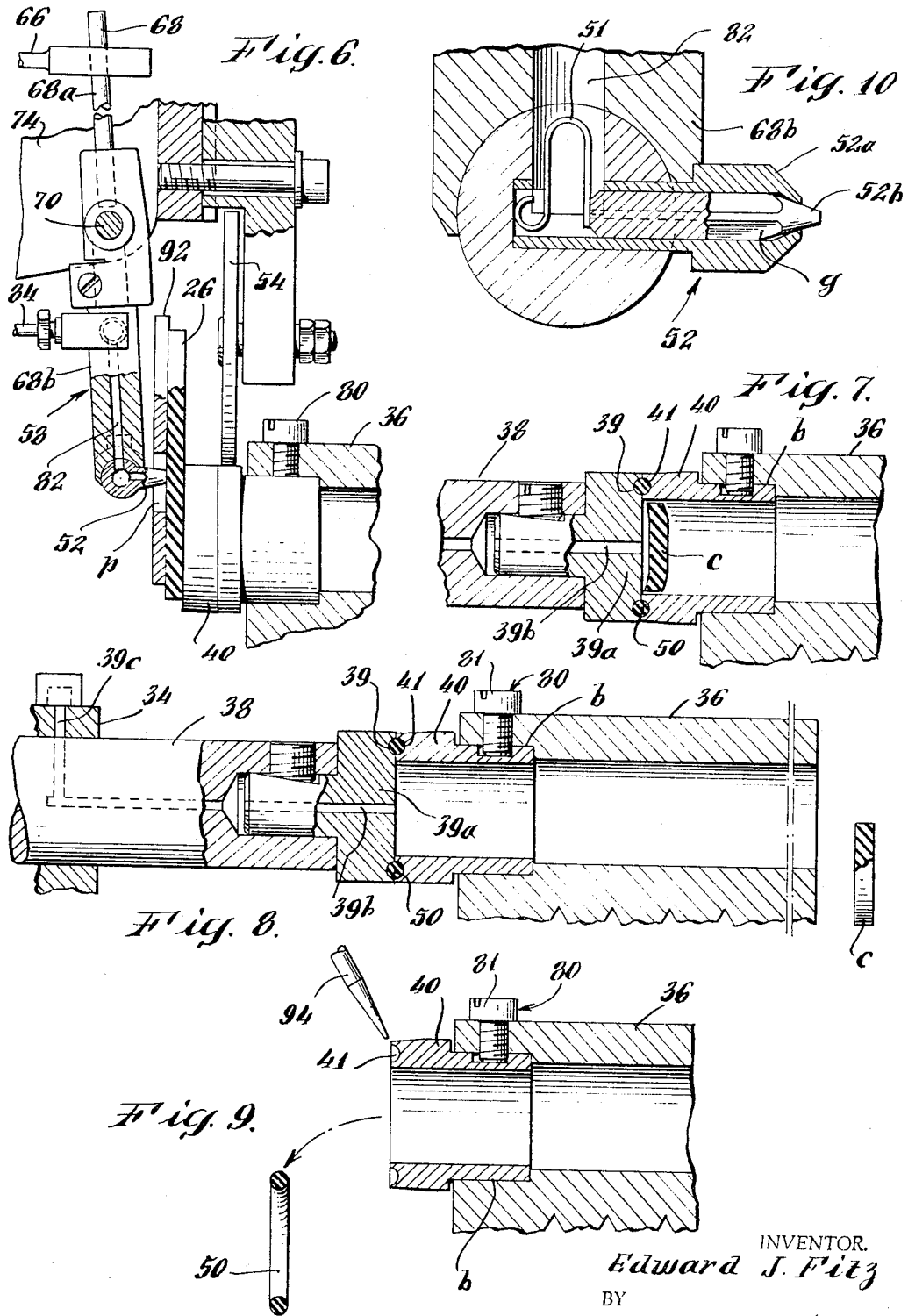

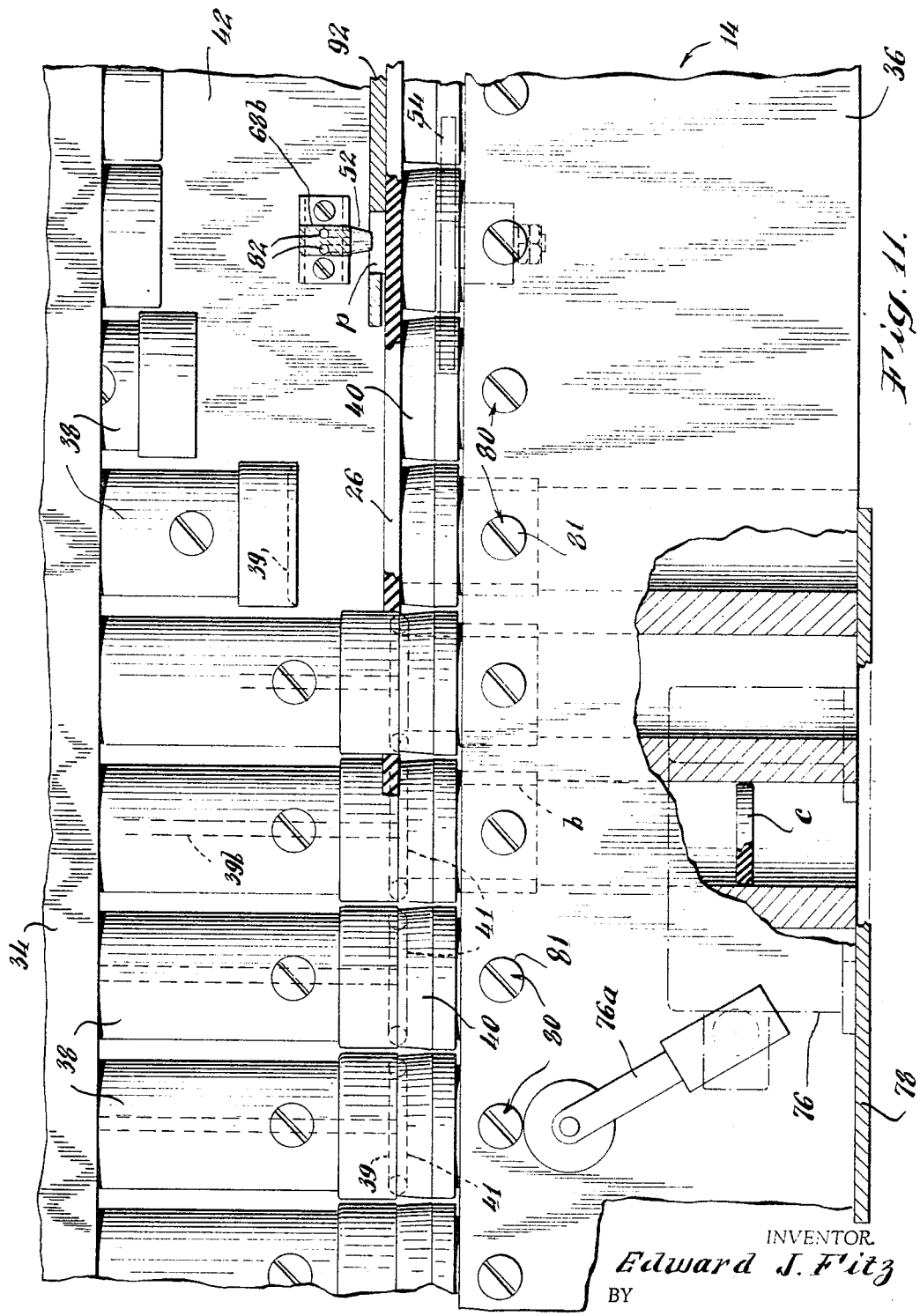

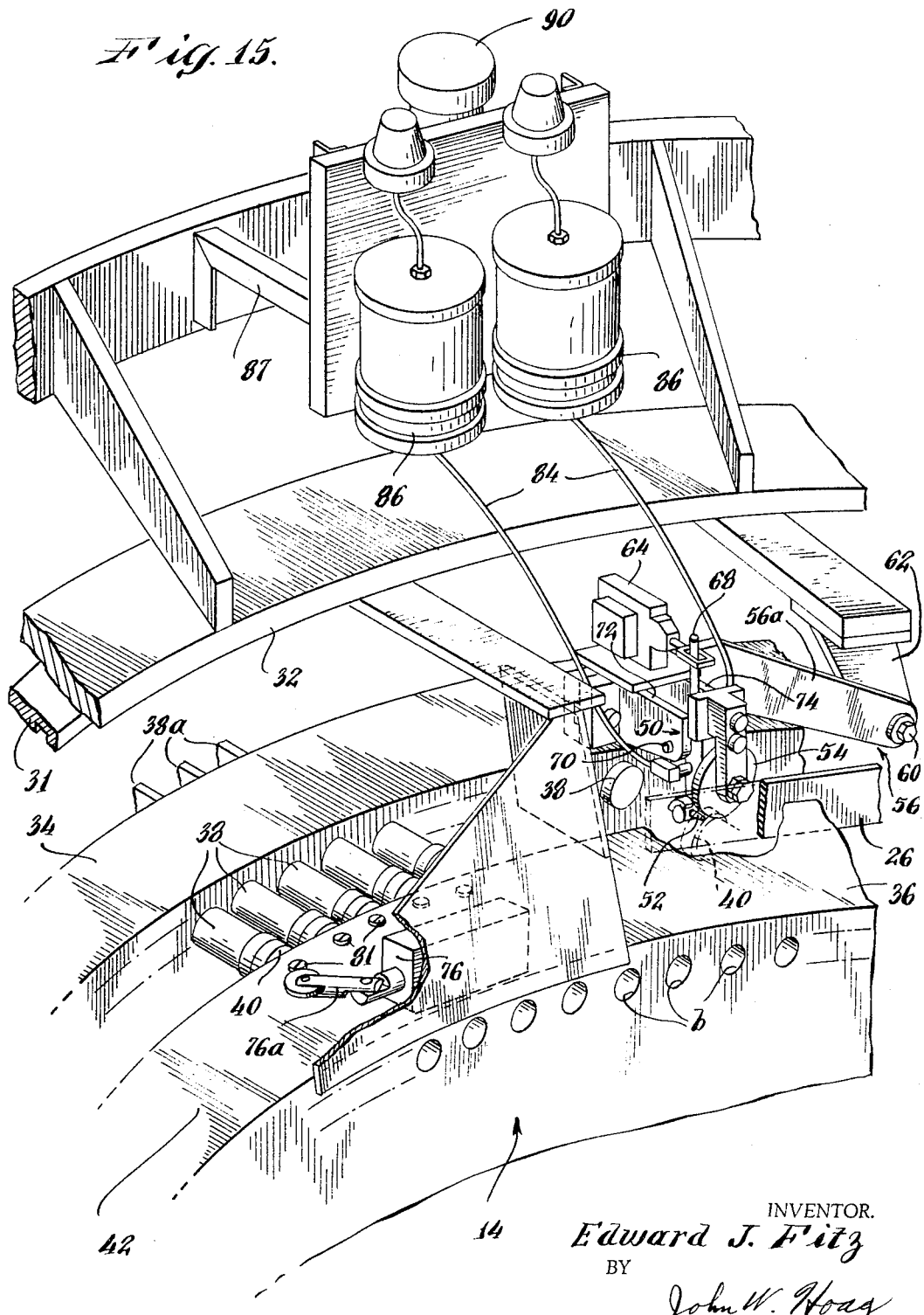

United States Patent Office 3,280,431
Patented Oct. 25, 1966

3,280,431
APPARATUS FOR MAKING MARKED
MOLDED ARTICLES
Edward J. Fitz, Fairfield, Conn., assignor to The Eagle
Picher Company, Willoughby, Ohio, a corporation of
Ohio
Filed Feb. 18, 1965, Ser. No. 433,724
13 Claims. (Cl. 18—21)

This invention relates to the marking of molded articles which are identified by marks thereon. As illustrated herein the marks are dots of color, but they may also be embossed, or imprinted, or of applied material.

In making articles in accordance with the embodiment of the invention disclosed herein a ribbon of moldable material is marked at spaced intervals on portions thereof which are thereafter immediately blanked out and inserted in die cavities and molded. The ribbon of moldable material is moved through a zone in which an endless series of pairs of axially aligned cooperating dies close successively upon the ribbon and blank out slugs and enclose the material to be molded during a molding period. The marking is done within said zone, on the areas to be blanked out, and without decreasing the relative speed between the ribbon and the pairs of dies.

Previously marked O-rings have been made by employing a conventional plate mold comprising upper and lower plates. The procedure involved first tubing the molding material and cutting off rings of the uncured material; then marking the rings manually and placing them manually in the cavities of the lower mold plate; closing the plate mold and placing it in a press where the molding material was cured, and finally removing the plate mold from the press and reopening the mold and removing the cured, marked articles manually. The capacity of the plate molds is limited, the procedure is time consuming, and several manual operations are involved.

An object of the invention is to provide molded articles with color marking molded therein.

Another object of the invention is to eliminate time consuming rehandling of molded articles to mark them.

Another object of the invention is to apply identifying marks while articles are being transformed from moldable composition to molded products, without decreasing the speed of the operation.

Another object of the invention is to provide a molding apparatus wherein a strip of moldable material is passed successively past a marking means and between the die members of successive pairs of dies which may be of various diameters, portions of the strip are successively marked with identifying markings, and thereafter the die members are closed on the strip successively to blank out and mold the marked portions of the strip.

The invention will best be understood by reading the following description in connection with the drawings in which, FIGURE 1 is a front elevation with some parts in section.

FIGURE 2 is a plan view of the structure shown in FIGURE 1.

FIGURE 3 is a sectional view taken on the line 3—3 of FIGURE 1 and largely in cross section.

FIGURE 4 is a vertical section taken on the line 4—4 of FIGURE 3.

FIGURE 5 is a detail plan view of a portion of the structure as seen in FIGURE 3.

FIGURE 6 is a side elevation, partly in section showing the nozzle of the dauber subassembly in marking position against the strip.

FIGURE 7 is a detail view showing a pair of dies in cross section after they have been closed, with a central portion of the slug of molded material, not used for filling the O-ring mold, being dispatched through the stationary die.

FIGURE 8 is a view similar to FIGURE 7 showing the unused portion of the died out blank material from strip 26 after having been expelled from the front end of the bore which has a stationary forming die positioned adjacent its other end and held in position by a screw.

FIGURE 9 is a view similar to FIGURES 7 and 8 and showing only the stationary die member after the molding operation and indicating an O-ring after it has been ejected from its molding cavity by an air jet.

FIGURE 10 is a detail view of the marking nozzle taken on the line 10—10 of FIGURE 4.

FIGURE 11 is a top plan view on an enlarged scale partly cut away showing part of the two rings of the carrier and illustrating the progressive movement of the movable dies while the rings and the strip of moldable material are passing together from the marking station through the die closing station, and also showing a satisfactory location for the means for timing and actuating the marking movements of the color dauber with respect to the position of the color dauber and of the mold members.

FIGURE 12 is a schematic view of the color line and of an electric circuit control for the marking means.

FIGURE 13 is a detail view on an enlarged scale showing a portion of the strip after it has been marked with two dots by the color dauber.

FIGURE 14 shows a portion of a molded O-ring, formed out of a portion of the strip shown in FIGURE 12, having the identifying dots of color thereon, and FIGURE 15 is a perspective view showing how the dauber subassembly is disposed in relation to its support means and the rings 34 and 36 in which the die members 38 and 40 are located.

For the purpose of illustration the invention is disclosed herein in connection with the manufacture of O-rings each marked with two identifying dots $d$. As an endless series of pairs of hollow axially aligned cooperating die members are successively opened and closed while travelling in a rotary path a ribbon of moldable material is led between pairs of dies which are in open position and is advanced in alignment with and at the same speed as the die members. While travelling in the space between open die members the ribbon is marked at intervals corresponding to the spacing between the dies and then the dies are closed and slugs of moldable material having the marks thereon are blanked out and the marked portions of the slugs are inserted into the annular mold cavities defined by the dies. The unused center portions of the slugs are ejected and returned to the mill, and the material in the mold cavities is molded as the carrier travels from the die closing station to the die opening station where the formed O-rings are ejected in any suitable way, as for example by jets of air directed into the mold cavity halves in the heads of the stationary die members.

The invention disclosed herein applies particularly to the methods and apparatus disclosed in Gora No. 3,008,-181 in which an endless series of pairs of axially aligned cooperating dies close successively upon a ribbon of moldable material and blank therefrom a quantity of material which is then molded within the cavity formed by the dies. The apparatus comprises a drum-like carrier having two parts 12 and 14 coaxially mounted on a shaft 16 for rotation about a horizontal axis and supported at one end of a base or frame 10. The carrier is rotated by drive means actuated by the motor 17, each pair of dies of course remaining aligned through their rotary path and closing and opening once during each rotation of the carrier.

At the other end of the base or frame there is mounted a mill M comprising a pair of mill rollers 18 and 20 which, drawing from a quantity or bank 21 of moldable material, such as uncured rubber or other thermoplastic material, forms on the roller 20 an enveloping layer 22 of determinate thickness controlled by the spacing between the rollers of the mill. A rotary cutter 24 removes from the layer 22 a strip 26 of determinate width, the void in the layer 22 being constantly filled by migration of the material from the bank 21 so that strip 26 is continuous so long as the bank is maintained by replenishing material and the machine is operated.

Part 12 (FIGURE 2) of the carrier has removably mounted on its periphery a series of actuating units 28 closely spaced and each including a cam follower 30. Secured to the frame 10 and overlying the carrier part 12 is an arcuate cam support 32 on which suitable cams 31 are adjustably mounted to be engaged by the follower 30 as the carrier part 12 rotates.

Mounted on part 14 of the carrier are two spaced ring members 34 and 36 in which, extending around their peripheries respectively, are series of pairs of forming die members 38 and 40, which are spaced apart and axially aligned. The dies of each pair may be separated and brought together and form between them a molding cavity defining the contour of the article to be formed therein. Each pair of the forming dies 38 and 40 constitutes, together with its actuating unit 28, what is herein termed a molding unit, there being a continuous succession of such units mounted around the carrier and travelling in a closed path.

As shown, the die members 38 are mounted to move axially and horizontally toward and away from the die members 40, and each die member 38 is connected to an axially aligned actuating unit 28 by which it is operated when the cam follower 30 reaches and is operated by the cam on the cam support 32 during the rotation of the carrier drum 11.

In the open position of the die members 38 and 40 there is a space 42 (see FIGS. 3 and 11) between the die members 38 and 40, and it is into this space that the strip 26 is advanced at the same speed as the die members, as for example by pressure rollers 43a and 43b driven by motor 17 which rotates carrier 11. Strip 26 is guided from the mill unit M by guides 44a and 44b, 44c and 44d, set at such angles that the horizontally disposed strip is twisted to lie in a vertical plane when entering the space 42 between the die members substantially tangentially to the cyclic path of the molding units. When so located, the die members 38 move to cavity-closing position and successively engage the strip 26 and press it against the die members 40, as shown in FIG. 11 with sufficient force to sever blanks from the strip and to forcibly fill the molding cavities formed by the die members. In the formation of O-rings the closing movement of the die members 38 also pushes the unused center portions of the slugs through the open center portion of dies 40 and an air jet from die members 38 then ejects this unused material as will be described. At the same time the strip 26, which is somewhat wider than the working ends of the two die members 38 and 40, is impaled on the die member which penetrates it and is carried along for a short distance with the carrier 11 by the die members. For semi-curing the formed articles, the die members 38 and 40 are heated by conduction or otherwise through their supporting means in any desired manner.

The strip 26 is carried along with the die members only so long as is necessary to control the strip and blank-out marked slugs comprising the required amount of material. That is to say, the strip is diverted from the cyclic path of the die members as soon as it is practical after the slug to form the article has been blanked out, preferably after only a few succeeding die members have thus impaled the strip. After blanking, in order to so divert the strip, it is pulled or peeled off the die members tangentially away from their cyclic path, while the die members remain closed.

The skeletonized strip travels back to the bank 21 in the mill M on the mill rollers 18 and 20, there to commingle with the material of the bank, the strip being assisted in its return movements by guide rollers 45 and 46, and by power-driven feed roller 43b and pressure roller 43a engaging it.

In the precision molding operation of the present machine, the marked material enclosed in the die members is subjected to heating sufficient to cause the molding material to fill the die cavities and become semi-cured to the degree where the molded article unless forcibly deformed will maintain its shape and size after being discharged from the cavity. The molded articles are discharged from the die members 38 and 40 when the die members are opened or separated from each other at the end of a cycle, to discharge formed articles and to receive the work strip 26. The discharged articles may be further cured or vulcanized as may be required.

The point at which the slugs are inserted into the die cavities is referred to herein as the loading point, indicated in the drawings as L, and the discharge point is indicated as D. A chute 48 is indicated below the discharge point to lead away the molded articles, as for example to a conveyor on which they may be subject to further curing or vulcanizing.

The actuating unit 28 comprises a separate subframe or housing 29, secured by bolts 29a to the part 12 of the carrier 11 and in substantial alignment with the axis of the forming dies 38 and 40 which are in part 14 of the carrier.

The upper portion of the subframe 29 carries a slide bar 33 supporting the cam follower roller 30 for engagement with the cam 31 carried by the cam support 32 mounted on the frame of the machine. The slide bar carries a block 33a having a vertical slot in which rides a roller on a bell crank 33b. The bell crank 33b is pivotally carried by a spring backed abutment bar 33c providing the relatively fixed pivot point of the bell crank 33b. The bell crank 33b has a pivotal connection 33d with a link 38a pivotally connected at 38b to the die member 38 which reciprocates in the bearing ring or flange 34 of the drum carrier part 14. With slide bar 33 in the position shown in FIGURE 3 the forming dies 38 are advanced and the pivotal connections between bar 33c, the bell crank 33b and the link 38a are in horizontal alignment so that any force tending to push the die member to open position will necessarily have to move the abutment bar 33c since linkage forms a toggle which is locked in the extended or cavity-closing position of the forming die 38. Unlocking of the toggle mechanism is effected by the follower cam roller 30 being engaged in suitable cam tracks provided in the cam 31 which is carried by the supporting structure 32.

The color marking means is mounted for movement within the space 42 between the rings 34 and 36, beyond the point at which the strip 26 enters into said space and in advance of the point L at which dies 38 are successively closed against the strip and against dies 40.

The color marking means comprises, dauber means in the form of nozzle or nozzles 52, spaced rearwardly of the carrier 11 and from the roller 54 which rides up and down successively on the stationary die members 40, a first support means 56 which carries both the dauber means and the roller 54, and a second support means 58 comprising a part of the first support means and by which the dauber is mounted on the first support means for movement relative to the first support means toward and away from strip 26 within space 42. The first support means comprises an arm 56a which is pivotally mounted by pivot 60 on the arm or bracket 62 which projects forwardly from the arcuate cam support 32. A solenoid 64 is also carried on the first support member 56, and a rod 66 connects the solenoid core to the upper end of an arm 68 which intermediate its ends is pivoted on pivot rod 70 and at its lower end carries the dauber means 52. Pivot rod 70 is supported between the arms or brackets 72 and 74, which form part of the first support means and project forwardly from arm 56a. The second support means forms part of the first support means and moves up and down with it in a plane passing between the rings 34 and 36, but the second support is also movable relative to the remainder of the first support, toward and away from strip 26.

The arm 68 is shown herein as comprising a portion 68b which is inserted between the bifurcated ends of a portion 68a which is mounted on pivot rod 70. Portion 68b receives the discharge end of conduits 84 through which coloring material may be supplied to the color dauber means through the channels 82 within portion 68b of arm 68. Portions 68a and 68b are locked together by means of screw 71.

The solenoid 64 is actuated, to move the dauber means into contact with strip 26 to mark it, by a micro-switch 76 which is supported at the front end of a bracket 78 which projects forwardly from cam support 32 across space 42 between rings 34 and 36. Switch 76 is positioned above the heads 81 of the screws 80 by which the stationary die members 40 are retained in the bores $b$ which extend through ring 36 around its periphery, and it comprises an arm and roller 76a which rides over the screw heads 80 and closes the micro-switch to actuate the solenoid 64 and cause the dauber means to mark the strip at points thereon which are spaced apart the same distance as the spacing between die members 40, and while these points on the strip are aligned with the molding cavities of the die members 40. Switch 76 may be placed anywhere around ring 36 if the spacing between all die members 40 is the same. As shown herein the bores $b$ are all spaced apart the same distance and therefore the spacing between die members 40 is the same even though die members 40 of different diameters may be used in the bores.

Differences in the diameters of die members 40 is compensated for by roller 54 which rides on die members 40 and thus raises or lowers support means 56 and 58 and adjusts the position of the dauber means so that it will be aligned successively with the molding cavity of each die member 40, by swinging the dauber support means up and down around pivot 60. Since the strip 26 and the dies are traveling at the same speed a color marking applied at a point on strip 26 which is aligned with the molding cavity in a particular die member 40 will remain aligned while the strip and the die members are moving from the marking station to the die closing station where a portion of the strip with the marking thereon will be blanked out, and the marked portion of the resulting marked slug will be enclosed in the O-ring mold, while the unused center portion of the slug is ejected. The movable dies 38 comprise an annular mold defining portion 39 surrounding and spaced from a center portion 39a which is aligned with the unused center portion $c$ of a marked, blanked out slug, and with the open center of the opposing stationary die 40 and the bore $b$ in front of the stationary die, the unused center portion $c$ is blown through the bore $b$ and ejected from its front end by a jet of air supplied through the axial passage 39b which extends from the air inlet 39c through the center portion 39a of each die 38.

Preferably the dauber means marks the strip with a colored cement formulation which is commercially available and forms no part of this invention. If such coloring material is used it may be supplied into channels 82 within arm 68 leading to the color dauber nozzle means 52, through flexible conduits 84, leading from the container or containers 86. As illustrated herein the coloring material is supplied in plastic bags placed in the container means 86 in communication with conduits 84 and collapsed progressively by the pressure of air supplied through line 88 and filter 90.

As shown herein each nozzle 52 comprises a casing 52a and a fluted plunger member 52b which is free to reciprocate within 52a against the spring member 51. The color marking material is supplied through the channels 82 into the casing 52a and around the inner ends of the channel $g$ in the surface of member 52b. When member 52b is pressed against the strip 26 and moves slightly inwardly against the pressure of spring 51 and against the coloring material which fills the space within casing 52a behind member 52b, the color marking material is projected against the strip.

While the relative spacing of the stations or places where the dauber is aligned with a particular molding cavity; the solenoid is actuated to cause the dauber to mark the strip; and the dies are closed to blank out and mold marked portions of the strip, is not necessarily fixed, I have found it convenient to align the dauber means with the molding cavity of a particular stationary die member 40 while it is the third die away from the die closing station, and to position the solenoid actuating switch where it will be disposed radially outwardly from the dies with its switch arm roller positioned to contact and ride over the screw head 81 for the screw 80 retaining in its bore $b$ the die member 40 which is the seventh die member away from the die closing station. This arrangement gives satisfactory clearance between the strip marking means, its actuating control means, and the die closing and opening stations.

Desirably a perforate guide 92 is provided in space 42, and the strip 26 is led between guide 92 and the stationary die members 40. The guide 92 serves to press the strip against the heads of stationary dies 40 while the strip is marked. The perforations $p$ in the guide are large enough, and are disposed, to allow the outlet end of dauber means 52 to be projected through the guide 92 into contact with strip 26 at a level in alignment with the level of the molding cavity part defined by die member 40 after the level of the dauber outlet end has been adjusted in accordance with the diameter of the member 40, as has been described.

In the embodiment of the invention described herein the strip 26 is marked at a point thereon which will be part of the resulting molded O-ring. At the end of the molding operation, after each pair of die members is separated, the marked O-ring is discharged from the molding cavity in any suitable way, as by air jet means 94 illustrated in FIGURE 9.

There has thus been provided a method and apparatus in which the above stated objects are accomplished in a thoroughly practical way.

What I claim is:

1. Apparatus for making marked molded products which comprises, a pair of cooperating blanking dies spaced apart in open position, means for advancing a strip of moldable material between the dies, means for marking the strip, means for adjusting the position of the marking means in accordance with the position of the molding cavity defined by each pair of dies, means for moving the marking means into and away from contact with the strip, means for successively closing and opening the dies, and means for controlling the means for moving the marking means into contact with the strip and the means for closing and opening the dies to effect marking of the strip while the die members are spaced apart and to close the die members after the strip has been marked to blank out and mold a marked portion of the strip.

2. Apparatus for forming molded articles marked with identifying marking, which comprises, a pair of axially aligned die members, one of which is movable relative to the other, means for moving the die members between open and closed position, means for feeding a strip of moldable material between said dies while they are open, a marking member movable in a phane normal to the axis of the dies and positioned on the far side of the strip from a molding cavity defined by the die members, means responsive to the size of one of the die members for axially aligning the marking member with the strip and with the molding cavity, sensing means operative while the marking member is so aligned for actuating the marking member to mark the strip, and means for timing the closing and opening of the die members to cause them to blank out a marked portion of said material from said strip and transfer it to fill the molding cavity defined by said die members in closed position.

3. Apparatus for making marked molded products which comprises, a pair of rings spaced apart and mounted for rotation around a common axis, means for rotating said rings, one of said rings having around its periphery a series of stationary dies, and the other of said rings having around its periphery a series of movable anvil dies axially aligned with the stationary dies, means for feeding a strip of moldable material through the space between said rings and in alignment with the molding cavities of the stationary dies, means for transferring color marking to moldable material, support means for the color transfer means which is movable to vary the position of the color transfer means, means controlled by the diameter of each stationary die for moving the color transfer means to align the latter with the strip and with the molding cavity of said stationary die, means for moving the color transfer means into, and out of, contact with the strip while the transfer means is axially aligned with the molding cavity of said stationary die member, means for opening and closing the dies, and means for actuating the color transfer means moving means and the closing of the dies so that the dies blank out and mold portions of said strip which have been marked by said marking means.

4. The apparatus claimed in claim 3 in which the marking means comprises a nozzle forming part of a subassembly which includes a pivoted arm supporting the nozzle, a solenoid, the core of which is attached to said arm, and an electric circuit for actuating the solenoid including switch means, and switch control means responsive to the spacing of the stationary die members.

5. Apparatus for making marked molded products which comprises, a pair of rings spaced apart and mounted for rotation around a common axis, means for rotating said rings, one of said rings having around its periphery a series of stationary dies, and the other of said rings having around its periphery a series of movable anvil dies axially aligned with the stationary dies, a perforate guide within the space between said rings and extending in an arc in alignment axially of the dies with a line joining the molding cavities defined by the stationary members, means for feeding a strip of moldable material through said space between said perforate guide and the molding cavities of the stationary dies, means for transferring color marking to moldable material including a dauber adapted to move through a perforation in said guide into contact with said strip, support means for the dauber which is movable to vary the position of the dauber, means controlled by the diameter of the stationary dies individually for moving the dauber support means to align the dauber with the strip, with a perforation in said guide, and with the molding cavities of the stationary dies individually, means for moving the dauber into, and out of, contact with the strip while said dauber is axially aligned with the molding cavities of the stationary die members successively, means for opening and closing the dies, and means for actuating the color transfer means and the closing of the dies in timed relation so that the dies blank out and mold portions of said strip which have been marked by said marking means.

6. Apparatus for making marked molded products which comprises, a pair of cooperating blanking dies, means for successively closing and opening the dies, means for moving the dies from a loading station through a molding zone, past a discharge station, and back to the loading station, marking means disposed between the discharge station and the loading station in a plane between the die members of said pair when they are open, a strip of moldable material, means for moving it past said marking means to said loading station, between the marking means and the molding cavity defined by one of said pair of dies, means for adjusting the position of the marking means within said plane in accordance with the diameter of the die and means for actuating the marking means and the die closing and opening means in sequence to mark the strip at a point thereon between the marking means and the molding cavity defined by one die member of a pair of dies, and to cause the die members to blank out and thereafter mold a marked portion of said strip.

7. In apparatus of the kind described including, two rings spaced apart and mounted for rotation around a common axis and each having bores extending through it which are parallel to said axis and are disposed adjacent its perimeter, series of blanking dies which may be of different diameters disposed in said bores, the dies in one ring being stationary and axially aligned with the dies in the other ring which are reciprocable toward and away from the stationary dies, and which in closed position coact with the stationary dies respectively to define molding cavities, means for closing and opening the dies successively as the rings are rotated, and means for leading a strip of moldable material through the space between the rings, and in alignment with the dies in one of said rings, a color dauber assembly including a dauber, a first support disposed in a plane passing between the two rings, a second support movable at right angles to the first support, means for mounting the first support for movement within said plane to align the dauber successively with the molding cavities defined by said stationary dies, the second dauber support being mounted on the first support for swinging movement at right angles to said plane, means responsive to the diameter of the stationary dies for moving the first support into, and out of, alignment with the strip, and the stationary dies, and means operative in timed relation to the closing of the dies for swinging the second support to move the dauber into and away from contact with the strip.

8. A machine comprising a drum-like carrier having two spaced apart coaxial rings mounted for rotation, a series of pairs of forming dies disposed with their centers equidistant from a common center around the peripheries of said rings respectively and comprising a series of movable dies disposed around the periphery of one ring and axially aligned with a series of stationary dies disposed around the periphery of the other ring, means for rotating the carrier, and means for feeding a strip of moldable material into the space between said rings and into alignment with a line joining the mold cavities of the dies, and at the same speed of travel as the dies, means for marking the moldable material, and means for moving the marking means in two planes relatively to the strip, including means coacting with the dies successively to position the marking means in one plane in accordance with the diameter of the dies, and means for moving the marking means in another plane into, and away from, contact with the strip, means for thereafter operating said dies to blank out portions of said strip which have been marked by said marking means and subject the blanked out portions to a molding pressure sufficient to reshape them into molded articles and to thereafter release the marked articles from the molding pressure.

9. A machine comprising a drum-like carrier having two spaced apart coaxial rings mounted for rotation, a series of pairs of forming dies disposed with their centers equidistant from a common center around the peripheries of said rings respectively and comprising a series of movable dies disposed around the periphery of one ring and axially aligned with a series of stationary dies disposed around the periphery of the other ring, means for rotating the carrier, means for feeding a strip of moldable material between said rings and between dies comprising the series of dies therein, a color dauber, a source of coloring material, and color feed line means interconnecting the dauber and said source, dauber support means movable radially of said rings, sensing means responsive successively to the size of the individual dies for adjusting the dauber support means radially of said rings, means for moving the dauber toward and away from the molding cavities defined by the series of dies in one of said rings and toward and away from points on said strip between the dauber and said molding cavities, to mark the strip, means for moving the movable die members successively to blank out portions of said strip and fill molding cavities defined by the pairs of die members, and means for actuating the marking movement of the dauber in timed relation to the closing of the die members to cause the dauber to mark selected portions of the strip in advance of closing of the die members to blank out and mold marked portions of the strip.

10. In apparatus of the kind described wherein a series of dies are arranged in pairs, the corresponding dies of each pair being disposed around a common center, and a strip of moldable material is led into the space between the dies, a marking member, means responsive successively to the diameter of the dies of one series of dies comprising said pairs for aligning the marking member successively with the molding cavities of said pairs of dies, means for moving the marker member toward and away from the strip to mark the strip in advance of, and in timed relation to, the closing of the dies, sensing means responsive to the spacing between the dies for actuating the marker moving member and means for closing the dies to blank out marked portions of the strip.

11. In apparatus of the kind described in which a strip of moldable material is led between die members comprising a series of pairs of axially aligned dies moving through an endless path, means for marking the strip, sensing means responsive to the diameter of the dies of one series for positioning the marking means relative to the mold cavities defined by each pair of dies and responsive to differences in the diameter of one series of dies, means for actuating the marking means to mark the strip in advance of the closing of each pair of dies, and means for moving the dies of each pair between open and closed position to blank out marked portions of the strip and mold them into the desired articles.

12. In apparatus of the kind described in which a strip of moldable material is led between die members comprising a series of pairs of axially aligned dies moving through an endless path, means for marking the strip, means disposed in the line of travel of the dies and responsive to differences in the diameter of one series of dies to cause the marking means to be raised and lowered to align it with the molding cavities of the pairs of dies successively, and other means disposed to sense the spacing of the dies and to actuate the marking means to mark the strip at intervals corresponding to the spacing of the dies, and means for closing the dies to blank out marked portions of the strip and mold them into articles of the desired size and shape and to open the dies for discharge of the molded articles.

13. The device claimed in claim 12 in which one die member of each pair is movable and comprises a center portion surrounded by a peripheral portion which is spaced radially from the center portion, and the other die member of said pair is stationary and has an open center and is mounted in a tubular bore open except for the stationary die member and the movable die member has an axial passage through which a jet of air may be provided when the die members are closed to expel excess molding material through the open center of the other die member and through the bore in which said other die member is mounted.

References Cited by the Examiner
UNITED STATES PATENTS

| 2,410,361 | 10/1946 | Prance | 264—132 X |
| 2,646,380 | 7/1953 | Barlow et al. | 264—132 |
| 2,889,651 | 6/1959 | Baldanza | 264—129 X |
| 2,943,354 | 7/1960 | Gora | 18—21 X |
| 2,980,963 | 4/1961 | Makowski | 264—132 |

OTHER REFERENCES

"Parts Molded, Decorated in One Step," Modern Plastics; April 1963; pages 90 and 91.

WILLIAM J. STEPHENSON, *Primary Examiner.*